(12) United States Patent
Lee (10) Patent No.: US 7,907,983 B1
(45) Date of Patent: Mar. 15, 2011

(54) WIRELESS HANDSET WITH LOCKING SLIDER

(75) Inventor: Woo Jae Lee, Manhattan, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 426 days.

(21) Appl. No.: 12/054,519

(22) Filed: Mar. 25, 2008

(51) Int. Cl.
*H04M 1/00* (2006.01)

(52) U.S. Cl. .................................. 455/575.4; 455/575.1

(58) Field of Classification Search ........................ None
See application file for complete search history.

(56) References Cited

U.S. PATENT DOCUMENTS

| | | | |
|---|---|---|---|
| 7,283,841 B2 | 10/2007 | Luke et al. | |
| 2005/0119034 A1* | 6/2005 | Kato et al. ................. | 455/575.4 |
| 2005/0277449 A1 | 12/2005 | Wu | |
| 2006/0205450 A1 | 9/2006 | Amano et al. | |
| 2007/0259685 A1* | 11/2007 | Engblom et al. ........... | 455/550.1 |
| 2009/0117944 A1* | 5/2009 | Lee et al. ....................... | 455/566 |
| 2009/0176532 A1* | 7/2009 | Chae et al. .................... | 455/566 |
| 2010/0267427 A1* | 10/2010 | Wraber et al. ............. | 455/575.4 |

* cited by examiner

*Primary Examiner* — Ajit Patel (57) ABSTRACT

A wireless handset has a relatively slidable first and second housing sections to provide an extended configuration for using a predetermined function of the wireless handset and a closed configuration for reducing a predetermined dimension of the wireless handset when not using the predetermined function. An electronically controllable lock is coupled to the first and second housing sections having an actuated position for inhibiting movement of the first and second housing sections out of the extended configuration and a deactuated position wherein movement of the first and second housing sections out of the extended configuration is not inhibited. A controller is coupled to the lock wherein the controller is programmed to determine whether the handset is in a predetermined operating mode and to place the lock into the actuated position when the handset is in the predetermined operating mode. The controller is also programmed to place the lock into the deactuated position when the handset is no longer in the predetermined operating mode.

22 Claims, 6 Drawing Sheets

WIRELESS HANDSET WITH LOCKING SLIDER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to cellular telephone handsets, and, more specifically, to slider phones having extendable parts to increase the form factor during usage of certain functions of the handset.

A popular form factor for wireless handsets including mobile cellular phones is the slider phone. A typical slider device has two separate housing sections that slide relative to each other to thereby change the size of the handset along at least one dimension between a configuration for storage or standby and a configuration for active usage involving particular functions of the handset. The housing sections can slide linearly or may rotate at various pivot points. When the slider is extended for use as a phone, the distance between the microphone and speaker of the handset is increased to better match the distance between the ear and mouth of the user. In addition, a keypad or other elements of a user interface may be uncovered for access when the housing sections are extended. Thus, certain keys may be hidden when the handset is in the closed configuration so they are protected from accidental activation when the handset is in standby. Typically, the user keeps the handset in the closed configuration for carrying in a pocket or purse and places the handset in the extended configuration in order to use it as a phone, personal digital assistant (PDA), or a camera, for example.

A problem sometimes experienced with the slider form factor is unintentional closing of the handset while intending to continue to use a desired function. For example, when the handset is being used as a wireless phone and it is being held in one hand by the user while attempting to perform other manual tasks such as opening a door or lifting some item with the other hand, the user can easily mishandle the handset to accidentally apply a closing force on the sliding components which may deactivate (i.e., hang up) the phone function. Even if the handset design is such that the call continues when the slider is closed or partially closed, its effectiveness would still be reduced since the microphone and speaker are no longer held at an optimal distance. Likewise, other functions being performed on a slider phone are best performed with the slider fully open. For example, a camera lens for a camera phone may be located on a surface of the housing which is covered when the slider is closed, thereby providing protection of the camera lens when the handset is not in use. Accidental closing or partial closing of the handset while using the camera function could ruin the capture of a photograph. In another example, a keypad or keyboard may extend from a covered configuration in order to use text-based communication functions such as email and SMS text messaging. Accidental closure of the housing sections while using any of these functions interferes with the performance of the functions. Thus, it would be desirable to reduce the chance of accidental closures while particular functions of the wireless handset are being actively used.

SUMMARY OF THE INVENTION

The present invention overcomes the disadvantages of the prior art by providing automatic locking of the separate housing sections based on the detected usage state of the handset. Thus, without requiring any special action by the user, an inadvertent and unintentional sliding out of the extended position during usage is avoided.

In one aspect of the invention, a wireless handset comprises a first housing section and a second housing section mounted to and selectably slidable with respect to the first housing section to provide an extended configuration for using a predetermined function of the wireless handset and a closed configuration for reducing a predetermined dimension of the wireless handset when not using the predetermined function. An electronically controllable lock is coupled to the first and second housing sections having an actuated position for inhibiting movement of the first and second housing sections out of the extended configuration and a deactuated position wherein movement of the first and second housing sections out of the extended configuration is not inhibited. A controller is coupled to the lock wherein the controller is programmed to determine whether the handset is in a predetermined operating mode and to place the lock into the actuated position when the handset is in the predetermined operating mode. The controller is also programmed to place the lock into the deactuated position when the handset is no longer in the predetermined operating mode.

DETAILED DESCRIPTION OF PREFERRED EMBODIMENTS

In the present invention, a programmable controller in a wireless handset includes software for controlling a locking mechanism that prevents the housing sections of a slider from being closed when in a predetermined operating mode. The operating mode comprises a situation when the handset is extended and a predetermined function is actively used. In one example, a lock is actuated during a voice call. The lock can either create a complete blockage against movement or can make the closing of the slider more difficult by adding resistance against closing.

Figure 1:
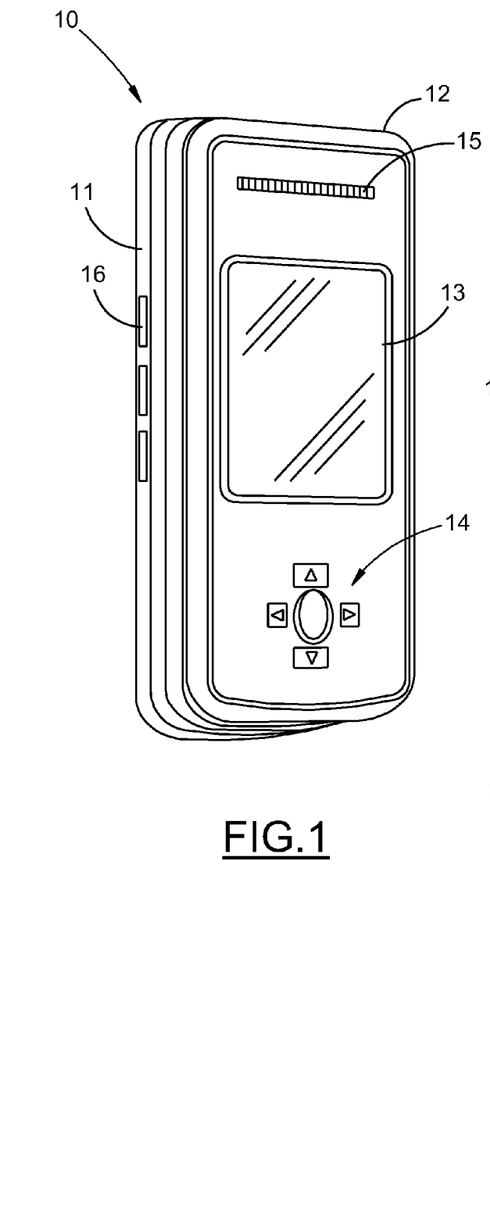
FIG. 1 is a perspective view of a handset in a closed configuration.

FIGS. 1-4 show a first embodiment of a slider phone according to the present invention. In FIG. 1, a handset 10 includes a first housing section 11 and a second housing section 12 mounted to housing section 11 and slidable with respect thereto. Handset 10 further includes a graphical display 13, a first keypad 14, a speaker 15, and side-mounted buttons which may include an override button 16 as described below.

FIG. 1 illustrates handset 10 in a closed configuration wherein the height of the handset is reduced for making the handset easier to store and carry when not using predetermined functions such as a phone call function. While in the closed configuration, a wireless phone function can be powered on and in a standby state to receive incoming calls.

Figure 2:
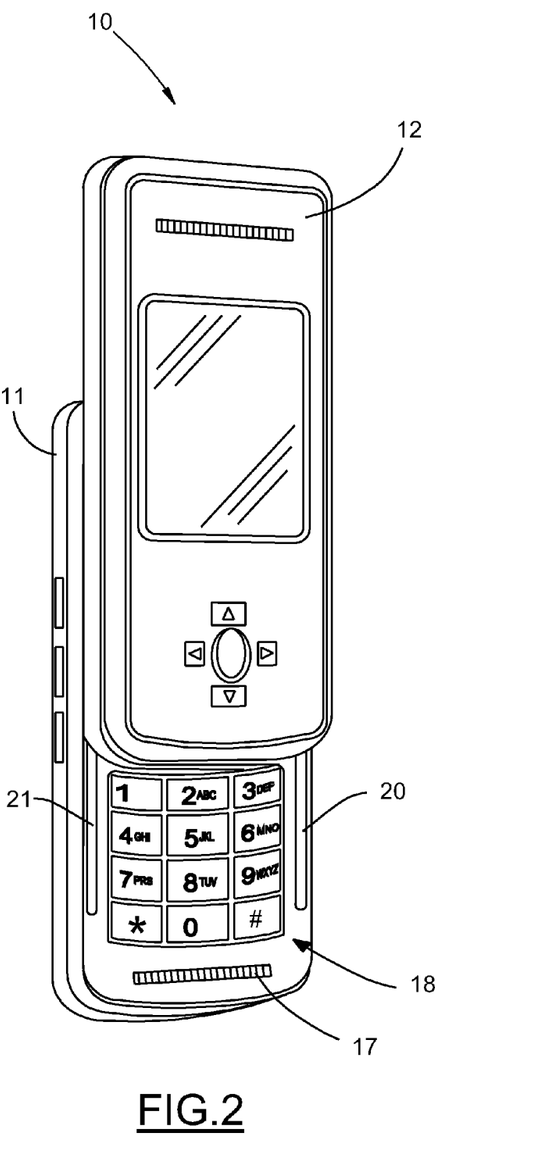
FIG. 2 is a perspective view of the handset in an extended configuration.

FIG. 2 shows handset 10 in an extended configuration for providing additional height so that the distance between speaker 15 and a microphone 17 is better matched to the typical distance between the ear and mouth of a user. In addition, sliding the housings 11 and 12 into the extended configuration uncovers a keypad 18 to be used when the handset is performing a mobile telephone function. Keeping keypad 18 covered when not in a configuration for performing telephone functions keeps the keypad hidden and prevents accidental presses of the keys when being carried. Housing section 11 includes a pair of tracks 20 and 21 within which housing 12 slides.

Figure 3:
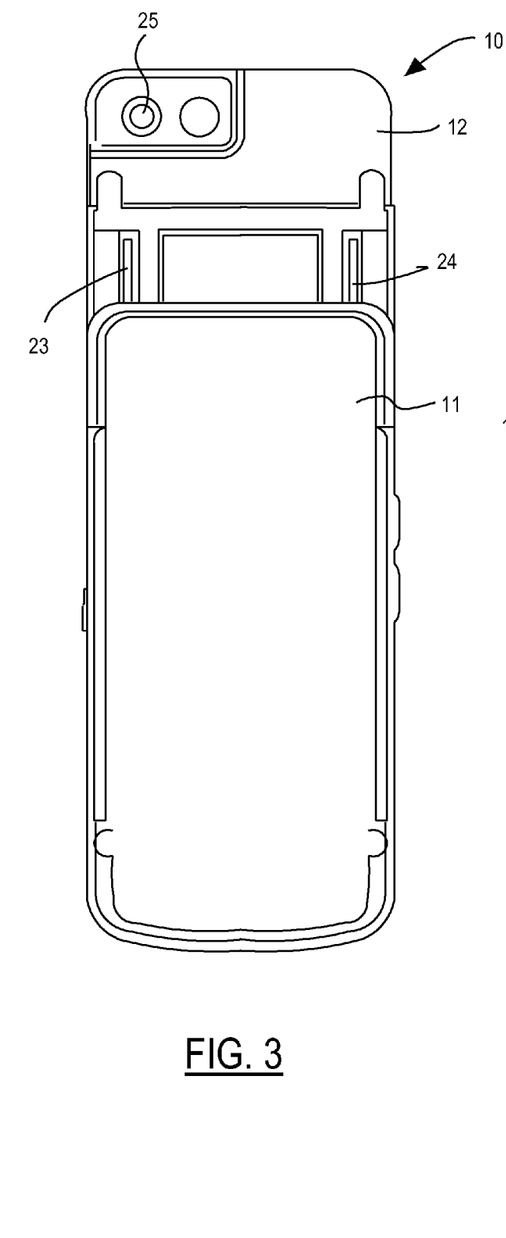
FIG. 3 is a rear view of the handset in the extended configuration.

FIG. 3 shows a rear view of handset 10. The backside of housing section 12 includes a pair of rails 23 and 24 for engaging channels 20 and 21 in housing section 11. The backside of housing section 12 further includes a camera lens 25 for providing a predetermined camera function. Lens 25 is protected by housing section 11 when handset 10 is in the closed configuration. Handset 10 must be placed in the extended configuration in order to use the predetermined camera function. The predetermined camera function can include still photography or video clips as is known in the art.

Figure 4:
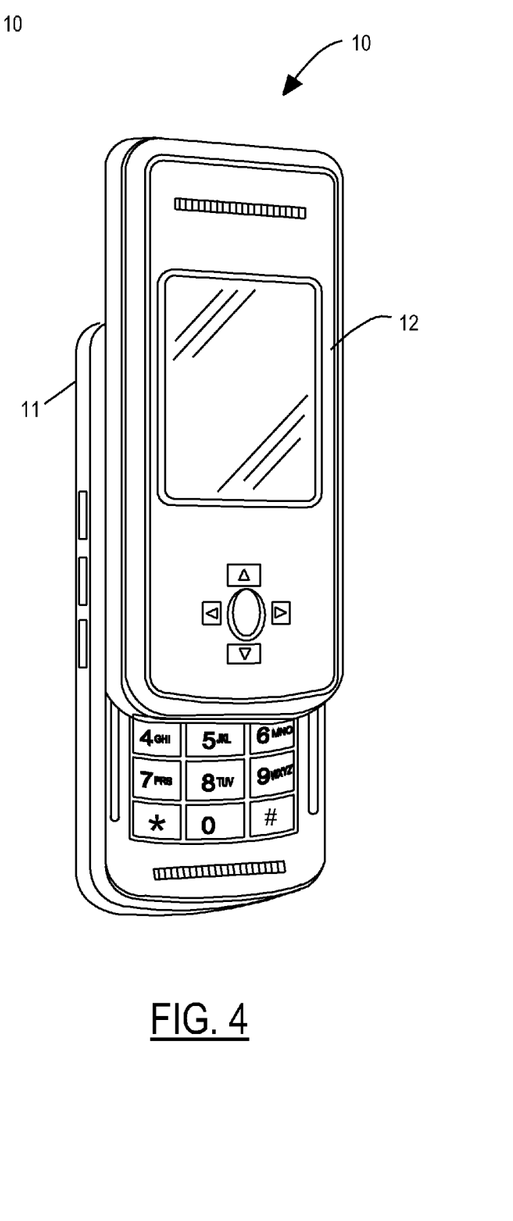
FIG. 4 is a perspective view of the handset in a partially-closed configuration.

As previously described, the present invention may engage lock when the handset is in the extended position which either blocks closing of the handset or provides a surmountable resistance against closing. Preferably, if movement is not blocked but an increased resistance against closing is provided when the lock is actuated, it would be desirable to only provide the increased resistance over only an initial portion of the closing distance to guard against accidental closings, but permitting full closing without excessive difficulty when the user really does intend to close the slider phone. As shown in FIG. 4, handset 10 may be slid from the fully extended position into a partially-closed configuration at which point the increased resistance against closing would be removed.

Figure 5:
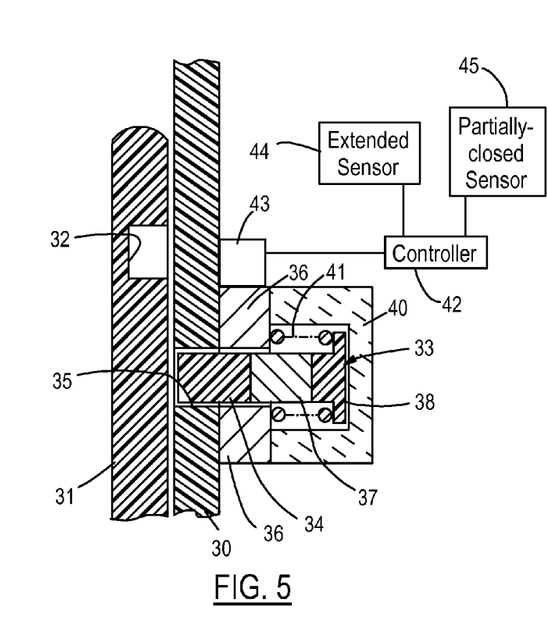
FIG. 5 is a cross-sectional and block diagram showing a first embodiment of a lock and controller of the present invention.

One preferred embodiment for an electronically controllable lock is shown in FIG. 5. A first housing section 30 and a second housing section 31 are relatively slidable. Second housing section 31 includes a receiving slot 32 comprising a depression in the surface thereof for receiving a solenoid plunger 33 extending through a corresponding aperture 35 in first housing section 30 aligned with receiving slot 32. Plunger 33 includes a distal portion 34 comprised of a nonmagnetic material such as thermoplastic. In the deactuated position shown in FIG. 5, nonmagnetic distal portion 34 of plunger 33 resides within a central aperture of an electromagnet 36 mounted to first housing section 30 coincident with aperture 35. Plunger 33 also has an end flange section 38 which may likewise be comprised of thermoplastic and a magnetically permeable section 37 between distal portion 34 and flange section 38. A retainer cap 40 is adhesively bonded to electromagnet 36 and retains plunger 33 in aperture 35. A spring 41 placed between flange 38 and electromagnet 36 tends to keep plunger 33 in the deactuated position shown in FIG. 5 wherein movement out of the extended configuration is not inhibited. Since aperture 35 and slot 32 are only aligned when in the extended configuration, locking can only be initiated while in the extended position.

Actuation of the lock is controlled by a programmable controller 42 coupled to a driver 43 connected to electromagnet 36. Controller 42 is also coupled to an extended position sensor 44 and a partially-closed position sensor 45.

Figure 6:
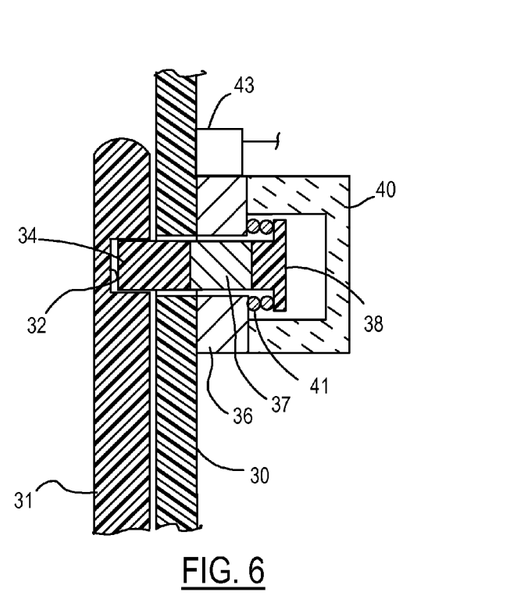
FIG. 6 is a partial cross section showing the lock of FIG. 5 in an actuated position.

The actuated position of the electronically controllable lock is shown in FIG. 6. Relative sliding of the housing sections has aligned aperture 35 with slot 32. Based on a determination by the controller that the handset is in a predetermined operating mode, electromagnet 36 is energized by driver 43 producing a magnetic field which draws magnetic section 37 of plunger 33 into electromagnet 36 so that distal portion 34 of plunger 33 enters slot 32 and blocks attempts to move the housing sections 30 and 31 out of the extended configuration. Actuation of the lock compresses spring 41 between flange 38 and electromagnet 36 so that when electromagnetic 36 is de-energized, plunger 33 automatically returns to the deactuated position thereby allowing the resumption of sliding movement between housing sections 30 and 31.

Figure 7:
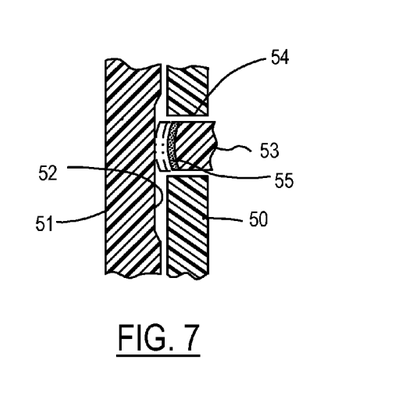
FIG. 7 is a partial cross section of an alternative embodiment of the lock.

FIG. 7 shows an alternative embodiment for the electronically controllable lock wherein the inhibition against movement comprises a predetermined resistance against movement over a predetermined range of sliding positions (rather than complete blockage). Thus, a housing section 50 is slidable with respect to a housing section 51. A receiving area 52 on housing section 51 may include a slot or depression. A solenoid plunger 53 is slidable within an aperture 54 of housing section 50 and has a first frictional surface 55 at its distal end. As shown in phantom lines, when solenoid plunger 53 is in the actuated position, frictional surface 55 drags against receiving area 52 to create a predetermined resistance against movement. Frictional surface 55 may comprise the natural edge of a thermoplastic material of plunger 53 or may be a coating of a higher friction material such as rubber, for example. Receiving area 52 may likewise include a coating and may be formed on a flat continuous surface of housing 51 instead of being formed in a depression or groove.

Figure 8:
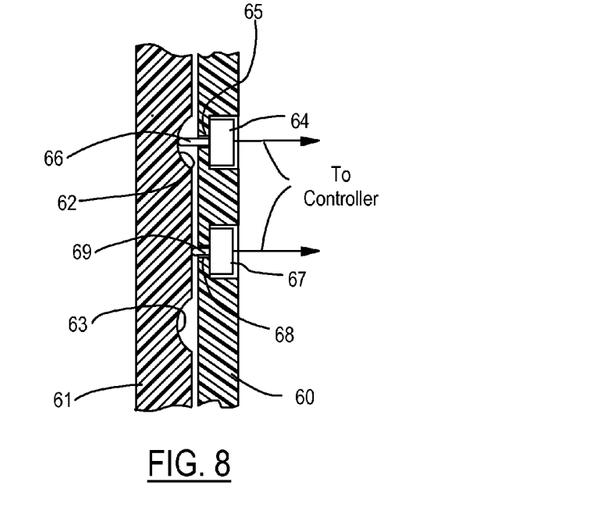
FIG. 8 is a cross-sectional view of one preferred embodiment of position sensors of the present invention.

FIG. 8 shows a first preferred embodiment of position sensors for sensing an extended configuration and a partially-closed configuration. A first housing section 60 is slidably mounted to a second housing section 61. A first demarcation hole 62 and a second demarcation hole 63 are provided in second housing section 61 for interfacing with position sensors 64 and 67 mounted to housing section 60. Position sensing switch 64 includes a sensing arm 66 urged through an aperture 65 toward second housing section 61 in order to enter demarcation hole 62 when in the extended configuration. When not in the extended configuration, sensing arm 66 is pushed toward switch 64 by the non-depressed side surface of housing section 61 to indicate that the handset is not in the extended configuration.

Partially-closed position sensor 67 includes a sensing arm 69 in its non-extended position extending through an aperture 68 to contact housing section 61. When housing section 61 is slid relatively upward in FIG. 8, aperture 68 will become aligned with demarcation hole 63 allowing sensing arm 69 to extend and causing switch 67 to indicate that the partially-closed position has been reached.

Figures 9, 10:
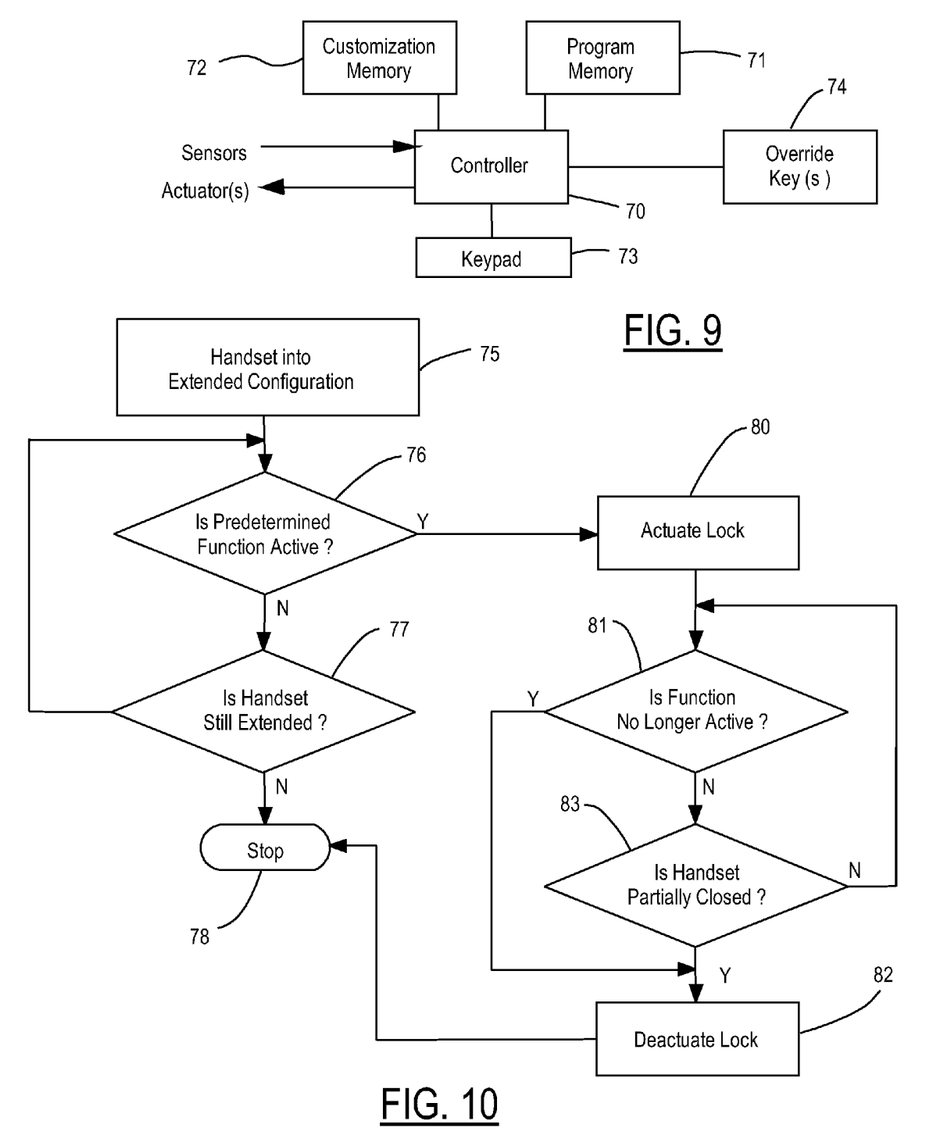
FIG. 9 is a block diagram showing one preferred embodiment of a control system of the invention.
FIG. 10 is a flowchart showing one preferred method for controlling a lock according to the present invention.

The control system of the present invention is shown in greater detail in FIG. 9. Programmable controller 70 is coupled to a program memory 71 and a customization memory 72. Program memory 72 contains programming for determining whether the handset is in a predetermined operating mode which determines that the controller should place the lock into the actuated position. Preferably, the predetermined operating mode comprises the conditions that 1) the housing sections are in the extended position and 2) a predetermined function of the handset is active. The predetermined function can be any function that depends on the handset being in the extended configuration such as a voice call, a camera function, or a text communication function.

Whether any particular function is "active" depends on how the function is normally used. For a voice call, the function may preferably be determined as being active between the occurrences of 1) a dialing sequence for an outgoing call or the answering of an incoming call, and 2) the termination of the voice call. The text communication function may comprise the processing of email or SMS text messages, for example. Furthermore, any function using user interface elements (e.g., keys, buttons, microphones, speakers, lenses, displays) that are covered when in the closed configuration can be a predetermined function. A keypad 73 shown in FIG. 9 may include alphanumeric keys and other control function keys any subset of which may be covered in the closed configuration.

Program memory 71 may define a plurality of predetermined functions that may potentially be used in controlling the automatic locking of the handset. Customization memory 72 is configurable by the user of the wireless handset to specify whether each of the plurality of handset functions is actually used as a predetermined function. Thus, the user may enter a setup mode of controller 70 for selecting a subset of the plurality of potential functions in order to apply automatic locking just to the ones desired by the user. For example, the user may select to have automatic locking when using the voice call function but not when using the text messaging function.

An override key 74 is provided in connection with controller 70 to allow the user to override a lock or unlock state as desired. In one embodiment, override key 74 may be used to directly change the actuated or unactuated position of the lock. Alternatively, override key 74 can be programmed to deactivate the automatic locking function.

FIG. 10 shows an overall method of the invention beginning in step 75 when the handset has been placed into the extended configuration by the user. In other words, a locking operation can only be initiated once the handset is manually placed into the extended configuration. A check is made in step 76 to determine whether the predetermined function is active. If not, then a check is made in step 77 to determine whether the handset is still in the extended configuration. If not, then the method ends at step 78. If still in the extended configuration, then a return is made to step 76 to continue monitoring for activation of the predetermined function. When the predetermined function is active, the lock is actuated in step 80. From then on, a check is made in step 81 to determine if the function is no longer active. If the function has become deactive, then the lock is deactuated in step 82 and the method terminates at step 78. If the function continues to be active, then a check is made in step 83 to determine whether the handset has been partially closed. If not, then a return is made to step 81 to continue monitoring the activity of the predetermined function. If the handset has been partially closed, then the lock is deactuated in step 82 to allow freedom of movement and the method is terminated in step 78.

Figure 11:
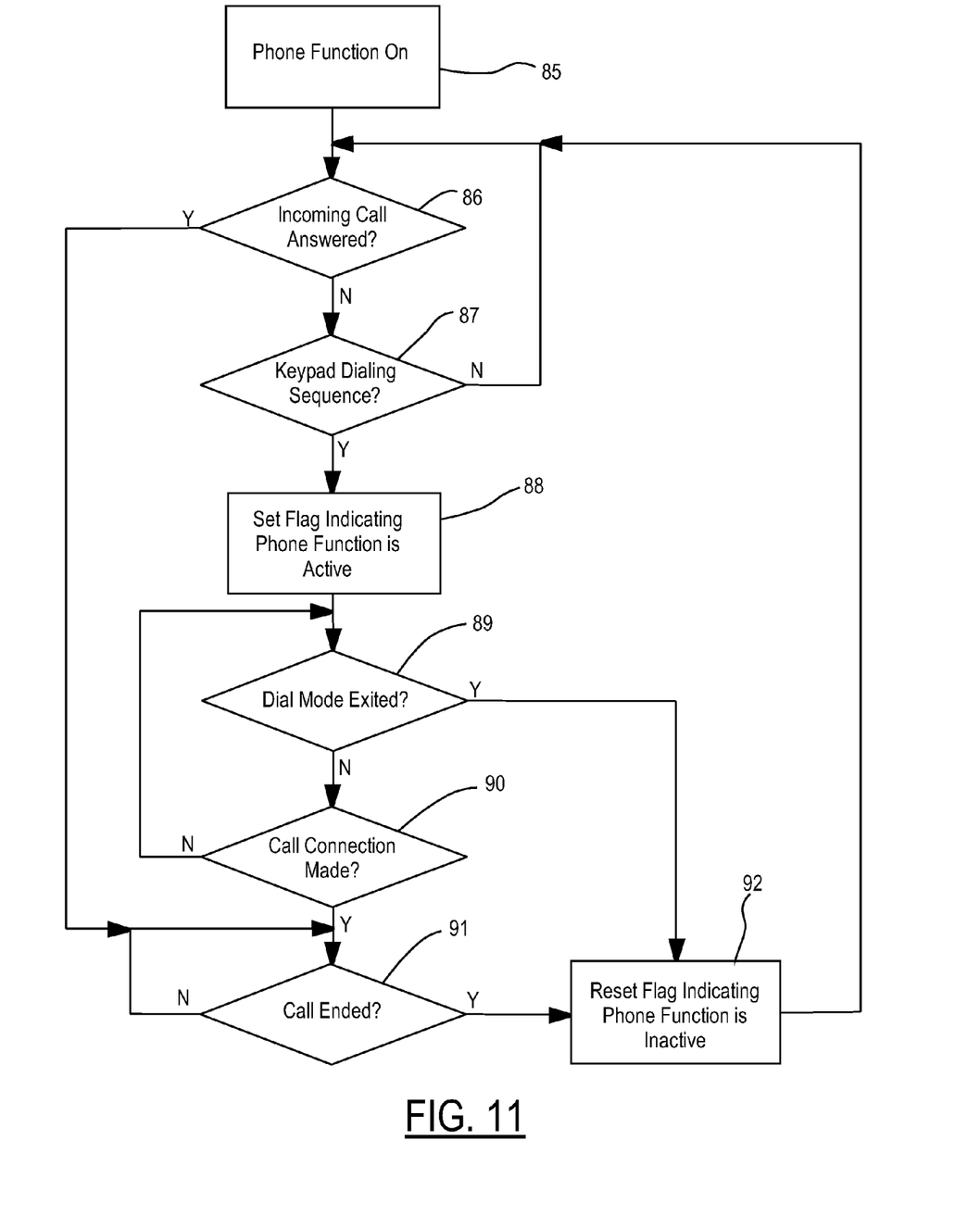
FIG. 11 is a flowchart showing a portion of the method in greater detail.

FIG. 11 shows a flowchart of preferred method used by the programmable controller for determining when a voice call function is actively being used. The phone itself may be powered on but not actively used (i.e., in standby) with the handset in its closed configuration awaiting an incoming call or awaiting the initiation of an outgoing call. Thus, in step 85 the phone function is on. A check is made in step 86 to determine whether an incoming call has been answered. If not, then a check is made in step 87 to determine whether a keypad dialing sequence has been initiated. If not, then a return is made to step 86 to continue monitoring for an incoming call or a subsequent dialing sequence.

If a dialing sequence is detected, then a flag is set in step 88 indicating that the phone function is active. The flag will be utilized by the controller to determine that the predetermined function is active when executing the method of FIG. 10. After the flag is set, a check is made in step 89 to determine whether the dial mode has been exited (e.g., by activating a cancel key or by a timeout), and if exited then a flag is reset in step 92 indicating that the phone function is inactive and a return is made to step 86. If the dial mode is not exited in step 89, then a check is made in step 90 to determine whether a call connection has been made. If not, then a return is made to step 89 to continue monitoring for the termination of the dial mode or a completed call. If the connection is made, then a check is made in step 91 to determine whether the call has ended. Likewise, if an incoming call was answered in step 86, the method checks and rechecks whether the call has ended in step 91. Once the call ends, the flag indicating that the phone function is inactive is reset in step 92 and a return is made to step 86.

Figure 12:
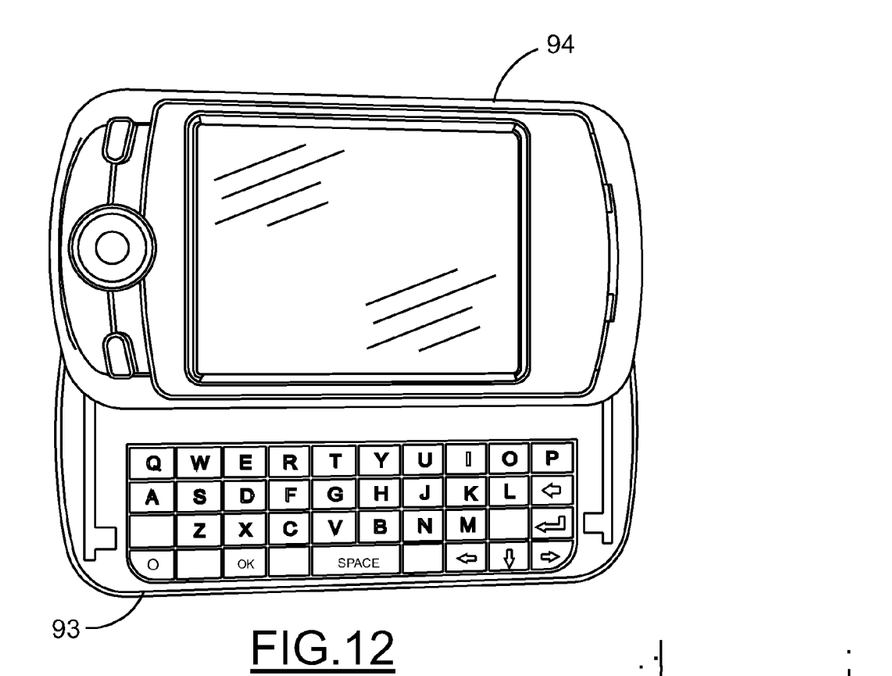
FIGS. 12 and 13 are front, plan views of other types of slider phones with which the present invention can be used.
Figure 13:
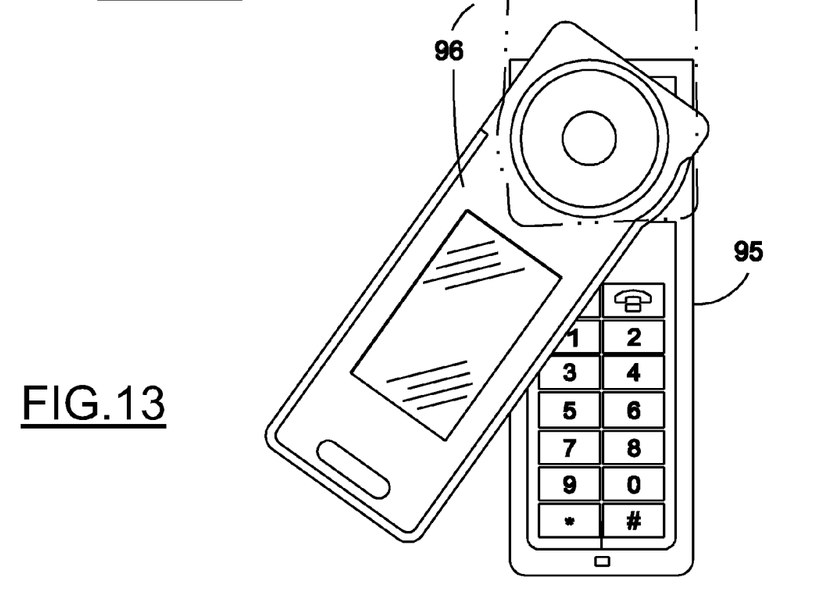

The present invention is useful with any handset with slidable housing sections that provide an extended configuration for using a predetermined function. FIG. 12 shows a PDA-like handset for sliding in a manner to reveal a full QWERTY keyboard on a housing section 93 which slides out from under a display section 94. FIG. 13 shows another embodiment wherein housing sections 95 and 96 are relatively rotatable to reveal dialing buttons and to provide an appropriate distance between speaker and microphone. The electronically controlled lock is easily adapted to any such handset configuration by arranging the solenoid plunger to enter a receiving slot only with the housing sections in their extended configuration.

What is claimed is:

1. A wireless handset comprising:
  a first housing section;
  a second housing section mounted to and selectably slidable with respect to the first housing section to provide an extended configuration for using a predetermined function of the wireless handset and a closed configuration for reducing a predetermined dimension of the wireless handset when not using the predetermined function;
  an electronically controllable lock coupled to the first and second housing sections having an actuated position for inhibiting movement of the first and second housing sections out of the extended configuration and a deactuated position wherein movement of the first and second housing sections out of the extended configuration is not inhibited; and
  a controller coupled to the lock wherein the controller is programmed to determine whether the handset is in a predetermined operating mode, wherein the controller is programmed to place the lock into the actuated position when the handset is in the predetermined operating mode, and wherein the controller is programmed to place the lock into the deactuated position when the handset is no longer in the predetermined operating mode.

2. The wireless handset of claim 1 wherein the predetermined operating mode comprises the housing sections being in the extended configuration and the predetermined function being active.

3. The wireless handset of claim 2 wherein the predetermined function is comprised of a voice call.

4. The wireless handset of claim 3 wherein the voice call is active from the time a dialing sequence is begun for an outgoing call or an incoming call is answered and until the voice call is terminated.

5. The wireless handset of claim 2 wherein the predetermined function is comprised of a camera function being executed by the wireless handset.

6. The wireless handset of claim 2 wherein the predetermined function is comprised of a text communication function being executed by the wireless handset.

7. The wireless handset of claim 6 wherein the text communication function is selected from the group comprising email and SMS text messaging.

8. The wireless handset of claim 2 wherein one of the housing sections includes user interface elements that are covered when in the closed configuration, and wherein the predetermined function is comprised of a handset application that uses the user interface elements that would be covered if in the closed configuration.

9. The wireless handset of claim 2 further comprising a customization memory configurable by a user of the wireless handset to specify whether each of a plurality of handset functions are included as a predetermined function.

10. The wireless handset of claim 2 further comprising a first sensor coupled to the controller for detecting that the housing sections are in the extended configuration.

11. The wireless handset of claim 10 further comprising a second sensor coupled to the controller for detecting that the housing sections are in a partially closed configuration, wherein the inhibited movement comprises a predetermined resistance against movement over a predetermined range of sliding positions between the extended configuration and the partially closed configuration, and wherein the controller determines that the wireless handset is not in the predetermined operating mode in response to the second sensor indicating the partially closed configuration.

12. The wireless handset of claim 2 wherein the controller determines the beginning of the predetermined operating mode when it simultaneously detects that the housing sections are in the extended configuration and that the predetermined function is active.

13. The wireless handset of claim 12 wherein the controller determines the ending of the predetermined operating mode when the predetermined function is not active.

14. The wireless handset of claim 12 further comprising a second sensor coupled to the controller for detecting that the housing sections are in a partially closed configuration, and wherein the controller determines the ending of the predetermined operating mode when the second sensor begins to indicate the partially closed configuration.

15. The wireless handset of claim 2 further comprising a manually-operable control key on one of the housing sections and coupled to the controller, wherein the controller responds to the control key to override the programming based on the predetermined operating mode to place the lock into one of the actuated or deactuated positions.

16. The wireless handset of claim 1 wherein the inhibited movement provided by the actuated position of the lock is comprised of a blockage against movement past a predetermined point.

17. The wireless handset of claim 1 wherein the lock comprises:
a solenoid plunger slidably mounted on one of the housing sections; and
a receiving slot in the other one of the housing sections for receiving a portion of the solenoid plunger when the lock is in the actuated position.

18. The wireless handset of claim 1 wherein the inhibited movement comprises a predetermined resistance against movement over a predetermined range of sliding positions.

19. The wireless handset of claim 1 wherein the lock comprises:
a solenoid plunger slidably mounted on one of the housing sections, wherein a distal end of the solenoid plunger includes a first frictional surface; and
a receiving area in the other one of the housing sections having a second frictional surface for sliding against the first frictional surface when the lock is in the actuated position to create a predetermined resistance against movement over a predetermined range of sliding positions.

20. A method of controlling the sliding of first and second housing sections of a wireless handset, comprising the steps of:
manually sliding the first and second housing sections from a closed configuration having a reduced predetermined dimension of the wireless handset to an extended configuration for using a predetermined function of the wireless handset;
generating a first detection signal in response to sliding into the extended configuration;
sending the first detection signal to a programmable controller;
the programmable controller detecting whether the predetermined function is actively in use;
if the predetermined function is actively in use, then the programmable controller actuating an electronically controllable lock to inhibit movement of the first and second housing sections out of the extended configuration;
the programmable controller detecting deactivation of the predetermined function and in response to the deactivation deactuating the electronically controllable lock so that movement of the first and second housing section is no longer inhibited.

21. The method of claim 20 further comprising the step of:
when the electronically controllable lock is actuated, manually sliding the first and second housing sections from the extended configuration to a partially-closed configuration;
generating a second detection signal in response to sliding into the partially-closed configuration;
sending the second detection signal to the programmable controller;
the programmable controller deactuating the electronically controllable lock in response to the second detection signal so that movement of the first and second housing section is no longer inhibited.

22. The method of claim 20 wherein, in response to the first detection signal, the programmable controller re-checks that the first and second housing sections continue to be in the extended configuration while waiting for the predetermined function to become actively in use, and halting detection of the predetermined function when not in the extended configuration.

* * * * *